United States Patent
Nishida et al.

(10) Patent No.: US 9,896,000 B2
(45) Date of Patent: Feb. 20, 2018

(54) CONTROL DEVICE OF ELECTRIC VEHICLE

(71) Applicant: Mitsubishi Jidosha Kogyo Kabushiki Kaisha, Tokyo (JP)

(72) Inventors: Masato Nishida, Nagoya (JP); Takanori Sugimoto, Tsushima (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/195,285

(22) Filed: Jun. 28, 2016

(65) Prior Publication Data

US 2016/0375794 A1 Dec. 29, 2016

(30) Foreign Application Priority Data

Jun. 29, 2015 (JP) ................................. 2015-130298

(51) Int. Cl.
*B60L 15/20* (2006.01)
*B60W 50/08* (2012.01)
(Continued)

(52) U.S. Cl.
CPC ....... *B60L 15/20* (2013.01); *B60W 30/18072* (2013.01); *B60W 30/18127* (2013.01); *B60W 50/082* (2013.01); *B60L 2250/28* (2013.01); *B60W 2030/1809* (2013.01); *B60W 2050/0062* (2013.01); *B60W 2520/10* (2013.01);
(Continued)

(58) Field of Classification Search
CPC ...... Y02T 10/7258; Y02T 10/76; B60L 15/20; B60L 2250/28; B60W 50/082; B60W 2710/083; B60W 30/18072; B60W 30/18127; B60W 2030/1809;
(Continued)

(56) References Cited

U.S. PATENT DOCUMENTS

| 8,932,179 B2* | 1/2015 | Banker ............... B60W 10/184 477/185 |
| 2008/0017427 A1* | 1/2008 | Nakanowatari ........ B60K 6/365 180/65.235 |

(Continued)

FOREIGN PATENT DOCUMENTS

| EP | 2546496 A1 | 1/2013 |
| EP | 2604461 A1 | 6/2013 |

(Continued)

*Primary Examiner* — Atul Trivedi
(74) *Attorney, Agent, or Firm* — Birch, Stewart, Kolasch & Birch, LLP

(57) ABSTRACT

A control device of an electric vehicle comprises: an operating state detector that detects the operating state of an accelerator pedal; a motor controller that executes deceleration control over a travel motor, including coasting control which reduces the driving force of the travel motor to zero, when the returning operation of the accelerator pedal is detected by the operating state detector; and a region setter that sets the range of the depression amount of the accelerator pedal for executing the coasting control, based on the depression amount of the accelerator pedal at the start of the returning operation of the accelerator pedal. The control device can switch among the types of control over the travel motor during the returning operation of the accelerator pedal, while suppressing a driver's sense of incongruity.

6 Claims, 10 Drawing Sheets

(51) Int. Cl.
*B60W 30/18* (2012.01)
*B60W 50/00* (2006.01)

(52) U.S. Cl.
CPC ... *B60W 2540/10* (2013.01); *B60W 2710/083* (2013.01); *Y02T 10/7258* (2013.01); *Y02T 10/76* (2013.01)

(58) Field of Classification Search
CPC ..... B60W 2050/0062; B60W 2520/10; B60W 2540/10
USPC ........................................................ 701/22
See application file for complete search history.

(56) References Cited

U.S. PATENT DOCUMENTS

| | | | | |
|---|---|---|---|---|
| 2010/0084211 | A1* | 4/2010 | Seidel | B60K 6/48 180/294 |
| 2011/0231048 | A1* | 9/2011 | Matsubara | B60K 6/365 701/22 |
| 2012/0325042 | A1 | 12/2012 | Takiguchi et al. | |
| 2013/0297136 | A1* | 11/2013 | Yamanaka | B60K 6/48 701/22 |
| 2015/0019058 | A1* | 1/2015 | Georgiev | B60L 7/18 701/22 |

FOREIGN PATENT DOCUMENTS

| | | | |
|---|---|---|---|
| FR | 3014805 | A1 | 6/2015 |
| JP | 3196599 | B2 | 8/2001 |

* cited by examiner

FIG.4

| Depression amount of accelerator pedal at start of returning operation | 10(nm) | 25(nm) | 40(nm) |
|---|---|---|---|
| Power running region | 25(%) | 40(%) | 60(%) |
| Coasting region | 25(%) | 20(%) | 15(%) |
| Regeneration region | 50(%) | 40(%) | 25(%) |

FIG.7

| Vehicle speed | Low | Medium | High |
|---|---|---|---|
| Power running region | 70(%) | 60(%) | 40(%) |
| Coasting region | 10(%) | 15(%) | 20(%) |
| Regeneration region | 20(%) | 25(%) | 40(%) |

FIG.8A
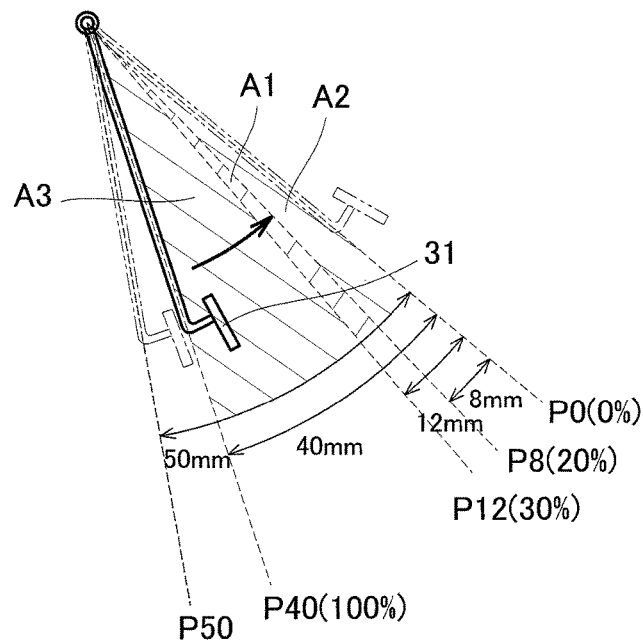
FIG.8B
FIG.8C
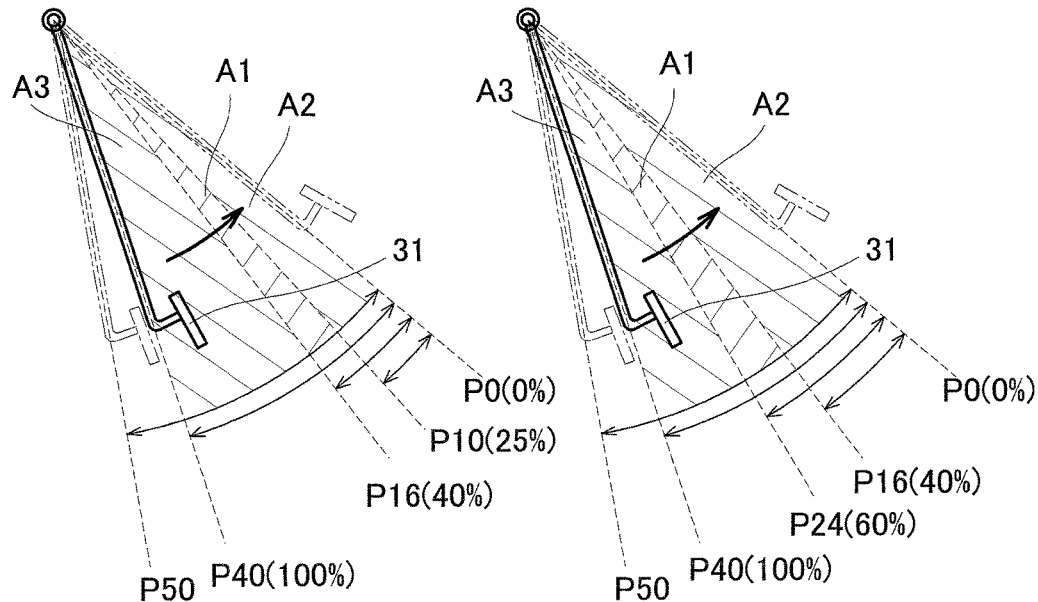

CONTROL DEVICE OF ELECTRIC VEHICLE

The entire disclosure of Japanese Patent Application No. 2015-130298 filed on Jun. 29, 2015 is expressly incorporated by reference herein.

TECHNICAL FIELD

This invention relates to a control device of an electric vehicle equipped with a travel motor operated by electric power supplied from a battery. Specifically, the invention relates to a control technology for the travel motor in performing the returning operation of an accelerator pedal.

BACKGROUND ART

Among electric vehicles are, for example, an electric vehicle (EV) having a travel motor (electric motor) as a drive device, and a hybrid electric vehicle (HEV) equipped with a travel motor and an engine as control devices. Some of the travel motors provided in these electric vehicles are configured to generate a driving force for running the electric vehicle by electric power supplied from the battery and, during deceleration, for example, act as a power generator to generate a regenerative braking force.

The current electric vehicle executes power running control for increasing the driving force of the travel motor in accordance with an increase in the amount of depression (depression amount) of the accelerator pedal when the accelerator pedal is stepped on (depressed), but exercises regeneration control for generating a regenerative braking force when the depression of the accelerator pedal is released during deceleration, namely, when the accelerator pedal is in a fully closed state.

Generally, the electric vehicle can be stopped by a driver stepping on (depressing) a brake pedal. Recent years, however, have seen an electric vehicle capable of so-called one pedal driving which enables the vehicle to be stopped merely by adjusting the depression amount of the accelerator pedal without the need for the driver to depress the brake pedal.

There is also an electric vehicle designed to enhance the operability of the accelerator pedal by a driver, namely, the vehicle configured to exercise ordinary power running control when the driver depresses the accelerator pedal, but to perform power running control, regeneration control, and coasting control taking an inertial travel (coasting) into consideration, as appropriate, in accordance with the depression amount of the accelerator pedal when the depression amount is to be decreased (see, for example, Patent Document 1).

PRIOR ART DOCUMENTS

Patent Documents

[Patent Document 1] Japanese Patent No. 3196599

Problems To Be Solved By The Invention

With the invention described in Patent Document 1, however, the types of control over the travel motor are switched based on the depression amount when the accelerator pedal is depressed to full openness. Thus, the behavior of the vehicle during the returning operation of the accelerator pedal may be unstable.

In detail, the depression amount at the start of the returning operation of the accelerator pedal is not necessarily constant. Thus, the timing at which the control over the travel motor is switched varies greatly depending on the depression amount at the start of the returning operation. Hence, if the control over the travel motor is always switched based on the depression amount when the accelerator pedal is depressed to full openness, the behavior of the electric vehicle during the returning operation may be unstable, giving the driver a sense of incongruity.

SUMMARY OF THE INVENTION

The present invention has been accomplished in light of the above-mentioned circumstances. It is an object of this invention to provide a control device of an electric vehicle, which can switch among the types of control over a travel motor during the returning operation of an accelerator pedal, while suppressing a driver's sense of incongruity.

Means for Solving the Problems

A first aspect of the present invention for solving the above problems is a control device of an electric vehicle equipped with a rechargeable battery and a travel motor driven by electric power supplied from the battery, the control device comprising: an operating state detector that detects the operating state of an accelerator pedal, including the depression amount of the accelerator pedal; a motor controller that controls the travel motor based on the results of detection by the operating state detector, and executes deceleration control over the travel motor, including coasting control which reduces the driving force of the travel motor to zero, when the returning operation of the accelerator pedal is detected by the operating state detector; and a region setter that sets the range of the depression amount of the accelerator pedal for executing the coasting control, based on the depression amount of the accelerator pedal at the start of the returning operation of the accelerator pedal.

BRIEF DESCRIPTION OF THE DRAWINGS

FIG. 4 is a table showing the relation between the depression amount of the accelerator pedal at the start of a returning operation and the size of the coasting region.

FIG. 7 is a table showing the relation between the speed of the electric vehicle and the size of the coasting region.

8 FIGS. 8A, 8B, 8C are views illustrating the relations of the depression amounts of an accelerator pedal to a coasting region, a regeneration region, and a power running region, according to Embodiment 2 of the present invention.

MODE FOR CARRYING OUT THE INVENTION

Embodiments of the present invention will be described in detail by reference to the accompanying drawings.
(Embodiment 1)

First of all, the schematic configuration of an electric vehicle is described.

Figure 1:
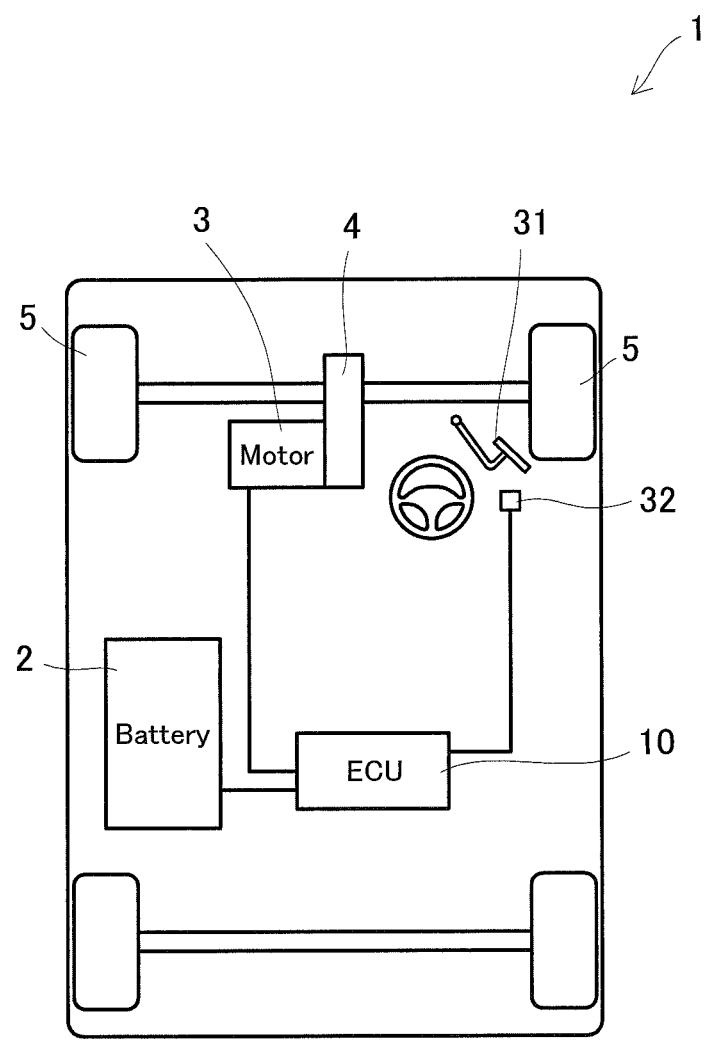
FIG. 1 is a view showing the schematic configuration of an electric vehicle equipped with a control device according to the present invention.

As shown in FIG. 1, an electric vehicle 1 according to the present embodiment is an electric car or vehicle (EV) equipped with a battery 2, which is a secondary battery, and a travel motor 3 which is an electric motor operating upon supply of electric power from the battery 2. The travel motor 3 is coupled to driving wheels (front wheels in the present embodiment) 5, for example, via an automatic transmission 4. The actions of the travel motor 3 are controlled by ECU (electronic control unit) 10 as a control device.

The ECU 10 controls the travel motor 3, as appropriate, based on signals from various sensors provided in the electric vehicle 1, for example, an accelerator pedal stroke sensor 32 for detecting the stroke of an accelerator pedal 31 (APS). Concretely, when the returning operation of the accelerator pedal 31 is detected, that is, when a decrease in the depression amount of the accelerator pedal 31 is detected, the ECU 10 exercises, as appropriate, deceleration control (including coasting (inertial) control and regeneration control) over the travel motor 3 in accordance with the amount of return of the accelerator pedal 31, thereby appropriately decelerating the electric vehicle 1.

Figure 2:
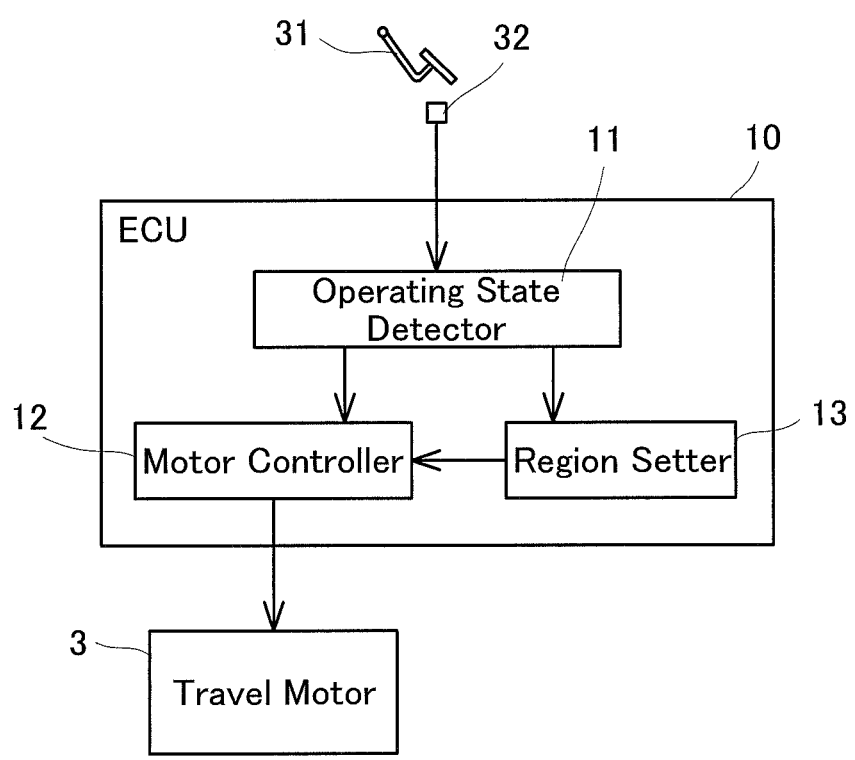
FIG. 2 is a block diagram showing a control device according to Embodiment 1 of the present invention.

The ECU 10 according to the present embodiment is equipped with an operating state detector 11, a motor controller 12, and a region setter 13, as shown in FIG. 2.

The operating state detector 11 detects the operating state of the accelerator pedal 31, for example, the depression amount (opening) of the accelerator pedal 31 by a driver, based on a signal from the accelerator pedal stroke sensor 32. Furthermore, the operating state detector 11 detects (determines) whether the accelerator pedal 31 is in a "depressing operation" in which the depression amount of the accelerator pedal 31 increase, or in a "returning operation" in which the depression amount decreases, from a change in the depression amount of the accelerator pedal 31.

The method of determining whether or not the accelerator pedal 31 is in the "returning operation" is not limited. If the depression amount of the accelerator pedal 31 decreases, it is permissible to determine at once that the accelerator pedal 31 is in the "returning operation". Alternatively, if the state of the depression amount decreasing lasts for a certain period or longer, namely, if the depression amount does not increase for the certain period or longer, it may be determined that the accelerator pedal 31 is in the "returning operation".

The motor controller 12 controls the travel motor 3, as appropriate, based on the results of detection by the operating state detector 11. In detail, if it is detected by the operating state detector 11 that the accelerator pedal 31 is in the "depressing operation", the motor controller 12 exercises power running control for increasing the driving force of the travel motor 3 in accordance with an increase in the depression amount of the accelerator pedal 31. If it is detected by the operating state detector 11 that the accelerator pedal 31 is in the "returning operation", on the other hand, the motor controller 12 exercises deceleration control over the travel motor 3, as well as power running control, in accordance with the depression amount of the accelerator pedal 31. The deceleration control is a type of control which allows the travel motor 3 to act so as to decelerate the electric vehicle 1, and which includes coasting (inertial) control for reducing the driving force of the travel motor 3 to zero, and regeneration control for operating the travel motor 3 by the rotation of the driving wheels 5 to generate power, thereby producing a regenerative braking force.

In the present embodiment, when it is detected by the operating state detector 11 that the "returning operation" of the accelerator pedal 31 is started, the motor controller 12 executes power running control until the depression amount of the accelerator pedal 31 decreases to a predetermined amount, and then exercises deceleration control, starting with coasting control, followed by regeneration control.

The range of the depression amount of the accelerator pedal 31 where the motor controller 12 exercises power running control (i.e., power running region), the range of the depression amount of the accelerator pedal 31 where the motor controller 12 exercises coasting control (i.e., coasting region), and the range of the depression amount of the accelerator pedal 31 where the motor controller 12 exercises regeneration control (i.e., regeneration region) are set by the region setter 13.

If it is detected by the operating state detector 11 that the "returning operation" of the accelerator pedal 31 is started, the region setter 13 sets the coasting region based on the depression amount (opening) of the accelerator pedal 31 at the start of the returning operation. That is, the region setter 13 sets the range of the depression amount of the accelerator pedal 31 where coasting control is executed by the motor controller 12. By so setting the coasting region, the regeneration region and the power running region are also set as a consequence.

Which range should be used as the coasting region with respect to the depression amount (opening) of the accelerator pedal 31 at the start of the operation is preset. In the present embodiment, the region setter 13 sets the range of the depression amount of 40% to 60% as the coasting region, with the depression amount of the accelerator pedal 31 at the start of the operation being taken as 100%.

Figure 3A:
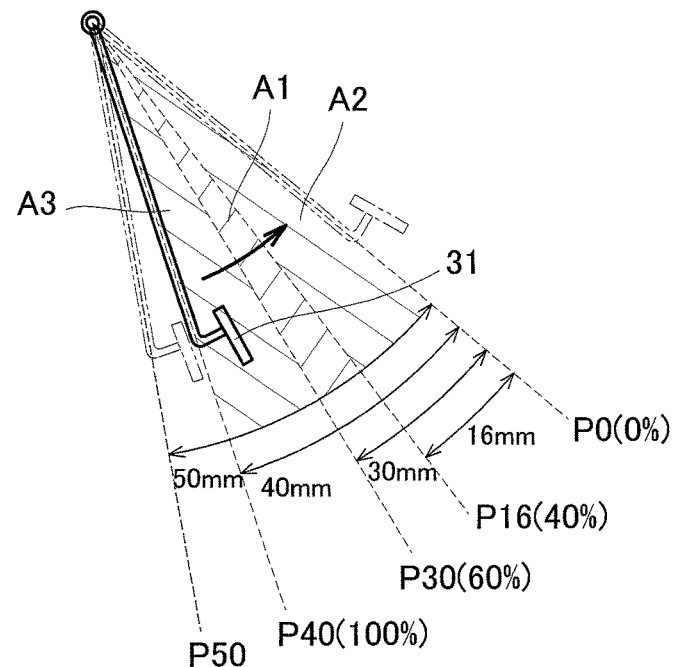
FIGS. 3A, 3B are views illustrating the relations of the depression amounts of an accelerator pedal to a coasting region, a regeneration region, and a power running region, according to Embodiment 1 of the present invention.
Figure 3B:
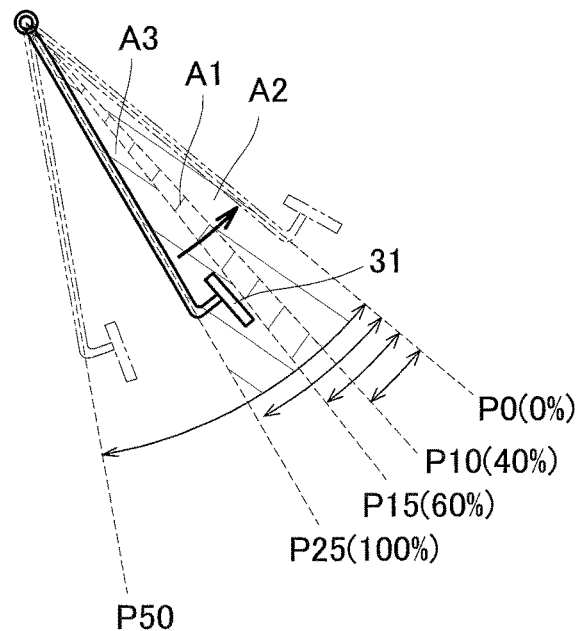

For example, assume that the accelerator pedal 31 is configured to be depressible from a fully closed position P0, at which the depression amount is 0 mm, to a fully open position P50, at which the depression amount is 50 mm, as shown in FIGS. 3A, 3B. Using such an accelerator pedal 31, assume that a returning operation is started at a position P40 at which the depression amount is 40 mm, as shown in FIG. 3A. In this case, the region setter 13 sets the range from a position P16 with a depression amount of 16 mm (40%) to a position P30 with a depression amount of 30 mm (60%) as a coasting region A1, based on the position P40 with a depression amount of 40 mm (100%). In accordance with this setting, the range from the position P0 with a depression amount of 0 mm (0%) to the position P16 with a depression amount of 16 mm (40%) is set as a regeneration region A2, and the range from the position P30 with a depression amount of 30 mm (60%) to the position P40 with a depression amount of 40 mm (100%) is set as a power running region A3.

Also assume, for example, that a returning operation is started at a position P25 with a depression amount of 25 mm, as shown in FIG. 3B. In this case, the region setter 13 sets the range from a position P10 with a depression amount of 10 mm (40%) to a position P15 with a depression amount of 15 mm (60%) as a coasting region A1, based on the position P25 with a depression amount of 25 mm (100%). In accordance with this setting, the range from a position P0 with a depression amount of 0 mm (0%) to the position P10 with a depression amount of 10 mm (40%) is set as a regeneration region A2, and the range from the position P15 with a depression amount of 15 mm (60%) to the position P25 with a depression amount of 25 mm (100%) is set as a power running region A3.

The motor controller 12 executes coasting control over the travel motor 3, if the depression amount of the accelerator pedal 31 is in the coasting region A1 during the "returning operation" of the accelerator pedal 31. On the other hand, the motor controller 12 executes regeneration control over the travel motor 3, if the depression amount of the accelerator pedal 31 is in the regeneration region A2 during the "returning operation", but executes power running control over the travel motor 3, if the depression amount of the accelerator pedal 31 is in the power running region A3 during the "returning operation". That is, upon detection of the accelerator pedal 31 in the "returning operation", the motor controller 12 performs deceleration control over the travel motor 3, as appropriate, in accordance with the depression amount (opening) of the accelerator pedal 31, even when the accelerator pedal 31 is in a stepped-on state.

In the present embodiment, as described above, the region setter 13 sets the coasting region A1, the regeneration region A2, and the power running region A3, based on the depression amount (opening) of the accelerator pedal 31 at the start of the returning operation. That is, the proportions of the depression amounts of the accelerator pedal 31 for setting the power running region A3, the coasting region A1, and the regeneration region A2 are rendered constant, no matter what the depression amount of the accelerator pedal 31 at the start of the operation is.

Because of the above procedure, when the returning operation of the accelerator pedal 31 is performed, the accelerated state or decelerated state of the vehicle conformed to the returning operation amount of the accelerator pedal 31 is stabilized, regardless of the depression amount at the start of the operation. Hence, the type of control over the travel motor 3 can be switched, with the driver's sense of incongruity during the returning operation of the accelerator pedal 31 being suppressed, and the behavior of the electric vehicle 1 is stabilized.

In the present embodiment, no matter what the depression amount of the accelerator pedal 31 at the start of the returning operation is, the range of 40 to 60% of this depression amount is set as the coasting region. However, it is permissible to change the range set for the coasting region, in accordance with the magnitude of the depression amount at the start of the returning operation.

For example, the larger the depression amount of the accelerator pedal 31 at the start of the returning operation, the smaller the size of the coasting region based on the depression amount of the accelerator pedal 31 at the start of the returning operation may be made, as shown in a table of FIG. 4.

Figure 5A:
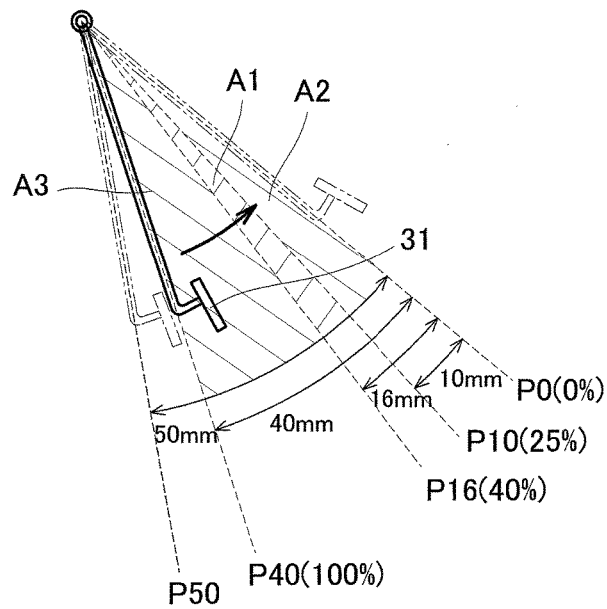
FIGS. 5A, 5B, 5C are views illustrating other examples of the relations of the depression amounts of the accelerator pedal to the coasting region, the regeneration region, and the power running region, according to Embodiment 1 of the present invention.

In this example, if the depression amount of the accelerator pedal 31 at the start of the returning operation is 40 mm, the range from a position P10 with a depression amount of 10 mm (25%) to a position P16 with a depression amount of 16 mm (40%) is set as a coasting region A1 based on a position P40 with a depression amount of 40 mm (100%), as shown in FIG. 5A. In accordance with this setting, the range from a position P0 with a depression amount of 0 mm (0%) to the position P10 with a depression amount of 10 mm (25%) is set as a regeneration region A2, and the range from the position P16 with a depression amount of 16 mm (40%) to the position P40 with a depression amount of 40 mm (100%) is set as a power running region A3.

Figure 5B:
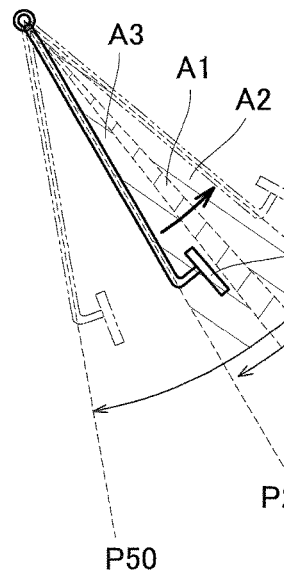

If the depression amount of the accelerator pedal 31 at the start of the returning operation is 25 mm, on the other hand, the range from a position P10 with a depression amount of 10 mm (40%) to a position P15 with a depression amount of 15 mm (60%) is set as a coasting region A1 based on a position P25 with a depression amount of 25 mm (100%), as shown in FIG. 5B. In accordance with this setting, the range from a position P0 with a depression amount of 0 mm (0%) to the position P10 with a depression amount of 10 mm (40%) is set as a regeneration region A2, and the range from the position P15 with a depression amount of 15 mm (60%) to the position P25 with a depression amount of 25 mm (100%) is set as a power running region A3.

Figure 5C:
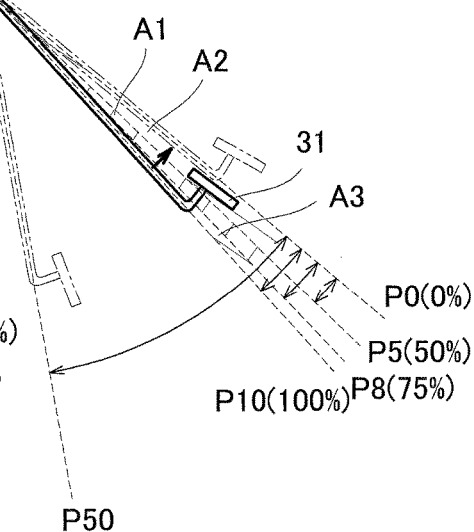

If the depression amount of the accelerator pedal 31 at the start of the returning operation is 10 mm, moreover, the range from a position P5 with a depression amount of 5 mm (50%) to a position P8 with a depression amount of 8 mm (75%) is set as a coasting region A1 based on a position P10 with a depression amount of 10 mm (100%), as shown in FIG. 5C. In accordance with this setting, the range from a position P0 with a depression amount of 0 mm (0%) to the position P5 with a depression amount of 5 mm (50%) is set as a regeneration region A2, and the range from the position P8 with a depression amount of 8 mm (75%) to the position P10 with a depression amount of 10 mm (100%) is set as a power running region A3.

By changing, as appropriate, the range for setting the coasting region in accordance with the magnitude of the depression amount at the start of the returning operation, as noted above, the behavior of the electric vehicle 1 during the returning operation of the accelerator pedal 31 can be rendered more stable.

(Embodiment 2)

Figure 6:
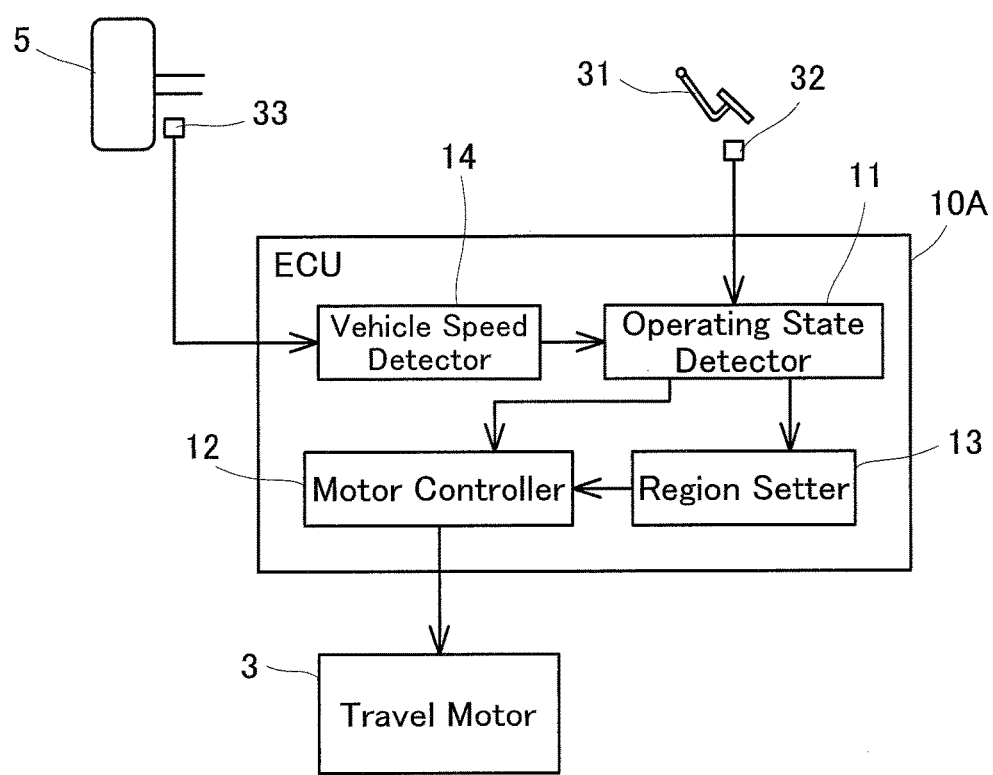
FIG. 6 is a block diagram showing a control device according to Embodiment 2 of the present invention.

FIG. 6 is a block diagram showing a control device according to Embodiment 2.

As shown in FIG. 6, ECU 10A according to the present embodiment is equipped with an operating state detector 11, a motor controller 12, and a region setter 13, and is further provided with a vehicle speed detector 14.

The vehicle speed detector 14 detects the speed of the electric vehicle 1 (vehicle speed) based on a signal from a vehicle speed sensor 33. In the present embodiment, the region setter 13 changes, as appropriate, the range of the depression amount of an accelerator pedal 31 for setting a coasting region, based on the detection results of the vehicle speed detector 14. For example, the region setter 13 sets the coasting region based on the depression amount of the accelerator pedal 31 at the start of a returning operation to be wider as the vehicle speed detected by the vehicle speed detector 14 becomes higher, as shown in a table of FIG. 7. It is recommendable that the depression amount conformed to the vehicle speed be determined, as appropriate, based on a motor torque corresponding to the vehicle speed, for example.

FIG. 7 is a table showing the relation between the vehicle speed and the range of the coasting region when a returning operation is started at the position where the depression amount is 40 mm. In this example, in the case of "Vehicle speed: Low" where the vehicle speed is relatively slow, the range for setting the coasting region is defined as a range of 20% to 30% of a reference value which is the depression amount of the accelerator pedal 31 at the start of the returning operation. In this case, the range from a position P8 with a depression amount of 8 mm (20%) to a position P12 with a depression amount of 12 mm (30%) is set as a coasting region A1 based on a position P40 with a depression amount of 40 mm (100%), as shown in FIG. 8A. In accordance with this setting, the range from a position P0 with a depression amount of 0 mm (0%) to the position P8 with a depression amount of 8 mm (20%) is set as a regeneration region A2, and the range from the position P12 with a depression amount of 12 mm (30%) to the position P40 with a depression amount of 40 mm (100%) is set as a power running region A3.

As shown in FIG. 7, in the case of "Vehicle speed: Medium" where the vehicle speed is higher than "Vehicle speed: Low", the range for setting the coasting region is defined as a range of 25% to 40% of a reference value which is the depression amount of the accelerator pedal 31 at the start of the returning operation. In this case, the range from a position P10 with a depression amount of 10 mm (25%) to a position P16 with a depression amount of 16 mm (40%) is set as a coasting region A1, based on a position P40 with a depression amount of 40 mm (100%), as shown in FIG. 8B. In accordance with this setting, the range from a position P0 with a depression amount of 0 mm (0%) to the position P10 with a depression amount of 10 mm (25%) is set as a regeneration region A2, and the range from the position P16 with a depression amount of 16 mm (40%) to the position P40 with a depression amount of 40 mm (100%) is set as a power running region A3.

As shown in FIG. 7, moreover, in the case of "Vehicle speed: High" where the vehicle speed is higher than "Vehicle speed: Medium", the range for setting the coasting region is defined as the range of a depression amount of 40% to 60%. In this case, the range from a position P16 with a depression amount of 16 mm (40%) to a position P24 with a depression amount of 24 mm (60%) is set as a coasting region A1, based on a position P40 with a depression amount of 40 mm (100%), as shown in FIG. 8C. In accordance with this setting, the range from a position P0 with a depression amount of 0 mm (0%) to the position P16 with a depression amount of 16 mm (40%) is set as a regeneration region A2, and the range from the position P16 with a depression amount of 16 mm (40%) to the position P40 with a depression amount of 40 mm (100%) is set as a power running region A3.

In the present embodiment, as seen above, the region setter 13 sets the coasting region A2 based on the depression amount of the accelerator pedal 31 at the start of the returning operation to be wider as the vehicle speed detected by the vehicle speed detector 14 becomes higher. In accordance with this setting, the power running region A3 is set to be narrower.

The higher the vehicle speed, the smaller the maximum value of the torque in power running control becomes. Thus, as the vehicle speed increases, the coasting region A1 is set to broaden, and the power running region A3 is set to narrow, as mentioned above. By so doing, fluctuations, associated with vehicle speed changes, in the change amount (Nm/mm) of the torque per unit returning amount of the accelerator pedal 31 in power running control are kept small. Therefore, the behavior of the electric vehicle 1 during the returning operation of the accelerator pedal 31 stabilizes irrespective of the vehicle speed.

If the range of the coasting region A1 is changed in accordance with the vehicle speed, as in the present embodiment, it is permissible to set the coasting region A1 to widen as the vehicle speed slows down. By so doing, if the vehicle travels in an urban area or the like and its average vehicle speed is relatively low, for example, coasting control is easy to execute, because the coasting region A1 is set to be wide. Thus, fuel consumption is reduced, so that fuel economy can be improved.

(Embodiment 3)

Figure 9:
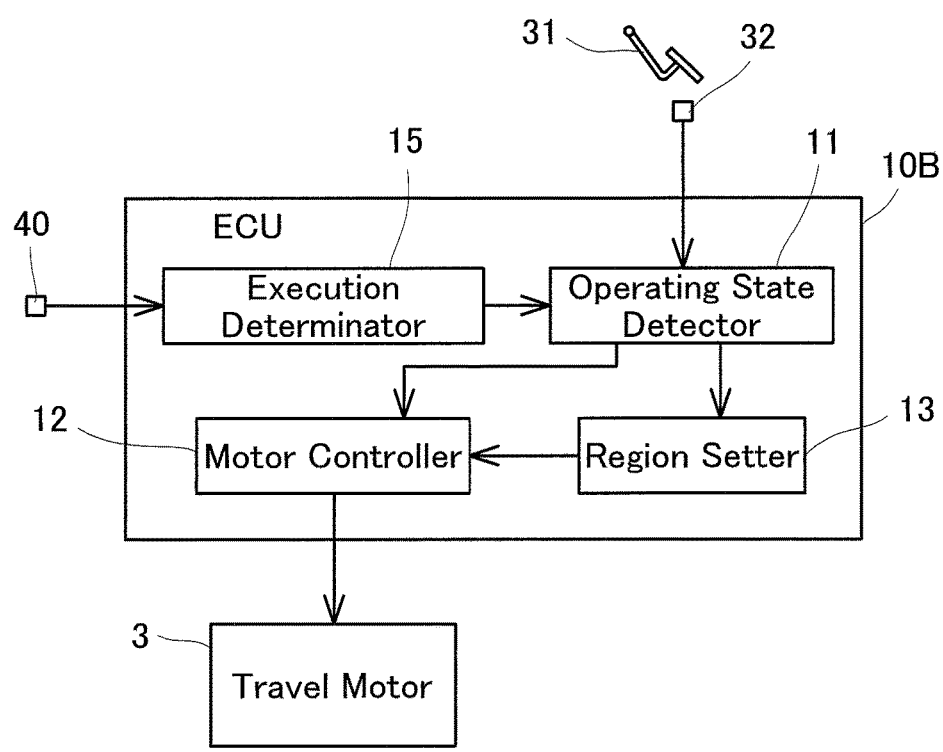
FIG. 9 is a block diagram showing a control device according to Embodiment 3 of the present invention.

FIG. 9 is a block diagram showing a control device according to Embodiment 3.

As shown in FIG. 9, ECU 10B according to the present embodiment is equipped with an operating state detector 11, a motor controller 12, and a region setter 13, and is further provided with an execution determinator 15. The configuration of the ECU 10B is the same as that in Embodiment 1, except for the provision of the execution determinator 15.

The execution determinator 15 determines whether or not there should be execution of power running control by the motor controller 12 during the returning operation of the accelerator pedal 31, in response to an instruction by an occupant such as a driver. If the driver performs a turning-on operation or a turning-off operation of an instruction unit 40 composed of a toggle switch or the like, for example, the execution determinator 15 determines whether power running control should be executed or not, in response to that operation.

If the driver performs an operation for turning on the instruction unit 40 (turning-on operation), for example, the execution determinator 15 determines that power running control should be executed. In this case, as illustrated in Embodiment 1, the region setter 13 sets the range of a depression amount of 40% to 60% as a coasting region, with the depression amount (opening) of the accelerator pedal 31 at the start of a returning operation being taken as 100%, and in accordance with this setting, sets a regeneration region and a power running region.

If the driver performs an operation for turning off the instruction unit 40 (turning-off operation), for example, the execution determinator 15 determines that power running control will not be executed. In this case, a power running region is not set, but only a coasting region and a regeneration region are set. That is, the region setter 13 sets a coasting region based on the depression amount (opening) of the accelerator pedal 31 at the start of a returning operation and, in accordance with this setting, sets a regeneration region. In the present embodiment, the region setter 13 sets the range of a depression amount of 60% to 100% as a coasting region, with the depression amount of the accelerator pedal 31 at the start of the operation being taken as 100%.

Figure 10:
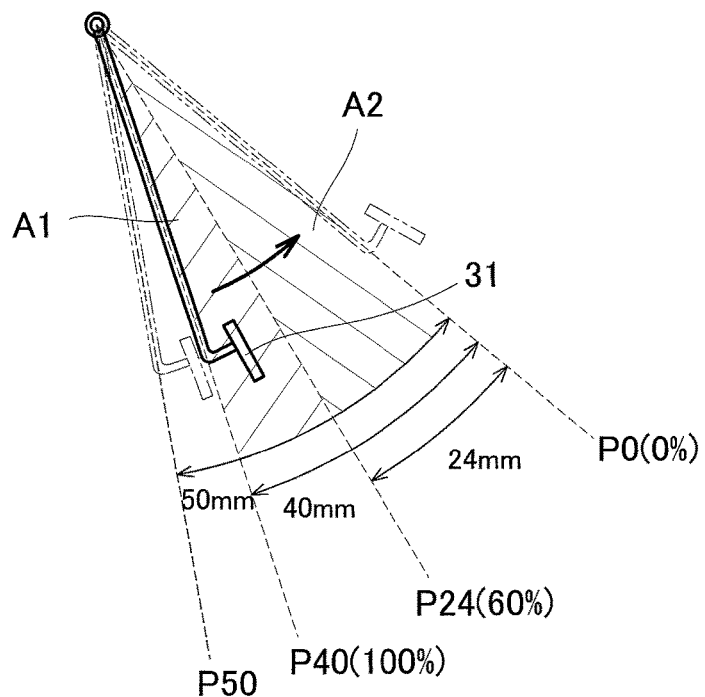
FIG. 10 is a view illustrating the relations of the depression amounts of an accelerator pedal to a coasting region and a regeneration region, according to Embodiment 3 of the present invention.

For example, assume that a returning operation is started at a position P40 at which the depression amount is 40 mm, as shown in FIG. 10. In this case, the region setter 13 sets the range from a position P24 with a depression amount of 24 mm (60%) to a position P40 with a depression amount of 40 mm (100%) as a coasting region A1, based on the position P40 with a depression amount of 40 mm (100%). In accordance with this setting, the range from a position P0 with a depression amount of 0 mm (0%) to the position P24 with a depression amount of 24 mm (60%) is set as a regeneration region A2.

By determining in response to the driver's instruction whether a power running region should be set or not, as noted above, the behavior of the electric vehicle 1 during the returning operation of the accelerator pedal 31 can be rendered more stable. When the returning operation of the accelerator pedal 31 is started, moreover, coasting control is executed immediately, without execution of power running control, so that power consumption can be kept down.

The embodiments of the present invention have been described as in the foregoing, but the invention is in no way limited to the above embodiments.

In the above embodiments, for example, a coasting region is set based on the depression amount of the accelerator pedal at the start of a returning operation and, in accordance with this setting, a regeneration region and a power running region are set. However, this method of setting the coasting region is not limitative. For example, a power running region and a regeneration region may be set based on the depression amount of the accelerator pedal at the start of a returning operation and, in accordance with this setting, a coasting region may be set. Hence, the stroke of the accelerator pedal in the coasting region may be set to be constant, while only the strokes of the accelerator pedal in the power running region and the regeneration region may be changed, as appropriate.

A second aspect of the present invention is the control device of an electric vehicle according to the first aspect, further comprising a vehicle speed detector that detects the speed of the vehicle, wherein the region setter sets the range of the depression amount of the accelerator pedal for executing the coasting control, based on the vehicle speed at the start of the returning operation of the accelerator pedal, as well as the depression amount of the accelerator pedal.

A third aspect of the present invention is the control device of an electric vehicle according to the second aspect, wherein the region setter sets the range for executing the coasting control to be broadened as the vehicle speed at the start of the returning operation of the accelerator pedal is increased.

A fourth aspect of the present invention is the control device of an electric vehicle according to the second aspect, wherein the region setter sets the range for executing the coasting control to be broadened as the vehicle speed at the start of the returning operation for the accelerator pedal is reduced.

A fifth aspect of the present invention is a control device of an electric vehicle equipped with a rechargeable battery and a travel motor driven by electric power supplied from the battery, the control device comprising: an operating state detector that detects the operating state of an accelerator pedal, including the depression amount of the accelerator pedal; a motor controller that controls the travel motor based on the results of detection by the operating state detector, and executes power running control for increasing the driving force of the travel motor in accordance with an increase in the depression amount of the accelerator pedal, or deceleration control over the travel motor, including coasting control which reduces the driving force of the travel motor to zero, when the returning operation of the accelerator pedal is detected by the operating state detector; an execution determinator that determines whether or not there should be execution of the power running control by the motor controller during the returning operation for the accelerator pedal, in response to an instruction by an occupant; and a region setter that sets the range of the depression amount of the accelerator pedal for executing the coasting control, based on the results of determination by the execution determinator.

EXPLANATIONS OF LETTERS OR NUMERALS

1 Electric vehicle
2 Battery
3 Travel motor
4 Automatic transmission
5 Driving wheel
10 ECU (control device)
11 Operating state detector
12 Motor controller
13 Region setter
14 Vehicle speed detector
15 Execution determinator
31 Accelerator pedal
32 Accelerator pedal stroke sensor
33 Vehicle speed sensor
40 Instruction unit (switch)

The invention claimed is:

1. A control device of an electric vehicle equipped with a rechargeable battery and a travel motor driven by electric power supplied from the battery, comprising:
   an operating state detector that detects an operating state of an accelerator pedal, including a depression amount of the accelerator pedal;
   a motor controller that controls the travel motor based on results of detection by the operating state detector, and executes deceleration control over the travel motor, including coasting control which reduces a driving force of the travel motor to zero, when a returning operation of the accelerator pedal is detected by the operating state detector; and
   a region setter that sets a range of the depression amount of the accelerator pedal in which the coasting control is executed, based on the depression amount of the accelerator pedal at a start of the returning operation of the accelerator pedal.

2. The control device of an electric vehicle according to claim 1, further comprising
   a vehicle speed detector that detects a speed of the vehicle,
   wherein the region setter sets the range of the depression amount of the accelerator pedal for executing the coasting control.

3. The control device of an electric vehicle according to claim 2, wherein
   the region setter sets the range for executing the coasting control to be broadened as the vehicle speed at the start of the returning operation of the accelerator pedal is increased.

4. The control device of an electric vehicle according to claim 2, wherein
   the region setter sets the range for executing the coasting control to be broadened as the vehicle speed at the start of the returning operation of the accelerator pedal is reduced.

5. A control device of an electric vehicle equipped with a rechargeable battery and a travel motor driven by electric power supplied from the battery, comprising:
   an operating state detector that detects an operating state of an accelerator pedal, including a depression amount of the accelerator pedal;
   a motor controller that controls the travel motor based on results of detection by the operating state detector, and executes power running control for increasing a driving force of the travel motor in accordance with an increase in the depression amount of the accelerator pedal, or deceleration control over the travel motor, including coasting control which reduces the driving force of the travel motor to zero, when a returning operation of the accelerator pedal is detected by the operating state detector;

an execution determinator that determines whether or not there should be execution of the power running control by the motor controller during the returning operation of the accelerator pedal, in response to an instruction by an occupant; and a region setter that sets a range of the depression amount of the accelerator pedal in which the coasting control is executed, based on results of determination by the execution determinator.

6. A control device of an electric vehicle equipped with a rechargeable battery and a travel motor driven by electric power supplied from the battery, comprising:

a vehicle speed detector that detects a speed of the vehicle;

an operating state detector that detects an operating state of an accelerator pedal, including a depression amount of the accelerator pedal;

a motor controller that controls the travel motor based on results of detection by the operating state detector, and executes deceleration control over the travel motor, including coasting control which reduces a driving force of the travel motor to zero, when a returning operation of the accelerator pedal is detected by the operating state detector; and a region setter that sets a range of the depression amount of the accelerator pedal in which the coasting control is executed, based on the vehicle speed at a start of the returning operation of the accelerator pedal.

* * * * *